United States Patent [19]

Pereira et al.

[11] Patent Number: 5,476,896
[45] Date of Patent: Dec. 19, 1995

[54] WATER-BASED CONTACT CEMENT

[75] Inventors: Maria A. Pereira; Rajaraman Iyer, Sao Paulo, both of Brazil

[73] Assignee: Borden, Inc., Columbus, Ohio

[21] Appl. No.: 298,423

[22] Filed: Aug. 30, 1994

[30] Foreign Application Priority Data

May 11, 1994 [BR] Brazil .................. 94019517

[51] Int. Cl.$^6$ .................................... C08L 31/04
[52] U.S. Cl. .................. 524/524; 524/114; 524/265; 524/380; 524/386; 524/271; 524/501; 524/503; 524/512
[58] Field of Search .................. 524/524, 114, 524/265, 380, 386, 271, 501, 503, 512

[56] References Cited

U.S. PATENT DOCUMENTS

| | | | |
|---|---|---|---|
| 3,630,980 | 12/1971 | Russell et al. | 260/27 |
| 3,974,112 | 8/1976 | Nadler et al. | 260/4 R |
| 4,130,528 | 11/1978 | Chen | 260/29.7 |
| 4,179,415 | 12/1979 | Bemmels | 260/4 R |
| 4,814,168 | 3/1989 | Sablotsky et al. | 424/78 |
| 5,095,046 | 3/1992 | Tse | 523/206 |
| 5,336,443 | 8/1994 | Odashima | 252/511 |

OTHER PUBLICATIONS

DuPont Contact Adhesives Based on Carboxylated Neoprene Latex 115, D. Coe et al.
Air Products and Chemicals (1991) Airflex 426.
DuPont, Neoprene Latex 115, 1986.
DuPont, Elastomers for Adhesives (before 1990).

*Primary Examiner*—Peter D. Mulcahy
*Attorney, Agent, or Firm*—Kenneth P. Van Wyck; George P. Maskas

[57] ABSTRACT

Water-based contact adhesives comprising:

(1) a carboxylated polychloroprene latex which provides elastomeric properties;

(2) a carboxylated poly(vinyl acetate-ethylene) aqueous emulsion which provides toughness to the adhesive;

(3) a tackifier resin dispersion;

(4) an organic or water soluble crosslinking agent for the carboxyl functionality of the polychloroprene and poly(vinyl acetate-ethylene); and (5) optionally an adhesion promoter.

19 Claims, No Drawings

WATER-BASED CONTACT CEMENT

This invention relates to water-based contact cement. More particularly, this invention relates to a water-based contact adhesive containing a carboxylated polychloroprene latex and an aqueous emulsion of a carboxylated vinyl acetate-ethylene polymer. The adhesive exhibits excellent stability and performance characteristics similar to solvent based contact adhesives.

BACKGROUND OF THE INVENTION

In the past decade, environmental considerations have forced reevaluation of many established products. Contact adhesives based on elastomeric polymers that have been available commercially for several decades, fall into this category.

The term contact adhesive, for our purposes, refers to an adhesive which when coated on two substrates adheres to itself upon substrate contact and drying. These products have been formulated in both solvent and water-based systems. While such products have been used in both consumer and industrial applications, generally the use of solvent based systems is widespread. This is due to their consistent performance in various bonding applications under a variety of operating conditions.

Water-based systems on the other hand are generally sensitive to operating conditions. As a result, their bonding properties fluctuate. For these reasons, water-based products have been used sparingly, especially in semi-production type operations.

Many of the commercially available water-based contact adhesives are based on polychloroprene latex and acrylic/vinyl acrylic type emulsions.

The stability of polychloroprene latices in combination with other commonly used ingredients necessary in adhesive compositions is a general problem. In recent years, latex compositions with improved stability have become available. These are generally based on polychloroprene-methacrylic acid copolymers stabilized with partially hydrolysed polyvinyl alcohol.

Another common characteristic of adhesive formulations based on polychloroprene latex is that they require the use of antioxidants and acid acceptors. Generally, these products have to be used in a dispersed form which has the overall effect of reducing the stability of the formulation and increasing its cost. An example of this is the use of zinc oxide which is often used in a dispersed form in polychloroprene based formulations. The zinc oxide serves two purposes: one to act as an acid acceptor; and secondly to serve as a crosslinking agent with carboxyl functional groups.

Formulations based on acrylic and vinyl acrylic emulsions generally display long "open times" and a characteristic best described as a permanent "dry tack". While long open times may be a desirable feature in a few applications, they are a major short coming in many production type applications of contact adhesives. Likewise, "dry tack" is desirable in pressure sensitive applications. Many contact adhesive uses, such as for decorative laminate assemblies, leather goods production, etc. require permanent bonds.

A novel way to combine the elastomeric features of a polychloroprene latex with the toughness of a polyvinyl acetate based emulsion has now been discovered.

SUMMARY OF THE INVENTION

The compositions of the present invention are water-based and comprise:

(1) a carboxylated polychloroprene latex which provides elastomeric properties;
(2) a carboxylated poly(vinyl acetate-ethylene) aqueous emulsion which provides toughness to the adhesive;
(3) a tackifier resin dispersion;
(4) an organic or water soluble crosslinking agent for the carboxyl functionality; and
(5) optionally an adhesion promoter.

This invention provides a combination of elastomeric features of a polychloroprene latex with the toughness of a polyvinyl acetate based emulsion. The composition forms crosslinked structures and doesn't contain dispersed inorganic materials such as zinc oxide or magnesium oxide. The compositions are based entirely on water and show excellent shelf stability. Importantly, they are a closer match in application characteristics to solvent based contact adhesives which are still an overwhelming favorite with many of the users.

DETAILED DESCRIPTION OF THE INVENTION

The Carboxylated Polychloroprene

The carboxylated polychloroprene is used in the form of an aqueous emulsion such as that stabilized with polyvinyl alcohol and which generally contains from about 40% to 60% by weight of solids.

The quantity of the carboxylated polychloroprene emulsion, by weight on a dry basis, can vary from about 35% to 55% and preferably 40% to 50% of the adhesive composition.

The Carboxylated Polymer of Vinyl Acetate and Ethylene

The carboxylated vinyl acetate-ethylene polymer is an aqueous emulsion which is generally used with a stabilizing agent such as polyvinyl alcohol. The solids content of such emulsion can vary over a wide range although it is preferred that the solids in the carboxylated vinyl acetate-ethylene emulsion be no less than about 60% by weight. The carboxylated vinyl acetate-ethylene polymer adds toughness, e.g., improved tensile strengths, to the adhesive composition.

The quantity of the carboxylated vinyl acetate-ethylene polymer emulsion in the adhesive composition can vary from about 15% to 35% and preferably about 20% to 30% on a dry basis by weight.

The Tackifier

The tackifier will generally be used in the form of an aqueous dispersion. Commercially well known tackifiers can be used such as: rosin based resins, e.g., modified rosin and rosin esters; hydrocarbon resins; terpene resins; phenolic resins, especially those based on p-tert. butyl phenol; urea-formaldehyde resins; melamine-formaldehyde resins; etc. The preferred tackifier is based on rosin esters.

The quantity of tackifier resin can vary from about 20% to 40% and preferably from about 25% to 35% by weight on a dry basis of the adhesive composition.

Crosslinking Agent

Organic and preferably water soluble crosslinking agents which react with the carboxylic function of the polychloroprene and vinyl acetate-ethylene polymer under ambient or elevated temperatures are suitable for use in this invention. The term "organic crosslinking agent" is meant to cover such agents as set forth below in this paragraph while excluding inorganic metal containing compounds such as that of zinc, e.g., zinc oxide, and magnesium, e.g., magnesium oxide. Illustrative of such crosslinking agents for use in this invention there can be mentioned water soluble: urea-formaldehyde resins; melamine-formaldehyde resins; phenol formaldehyde resins; aldehydes etc. The preferred crosslinking agents are dialdehydes such as glyoxal which is generally provided as a 40% by weight aqueous solution.

The quantity of the crosslinking agent is in an amount sufficient to crosslink the carboxyl function of the carboxylated polymers. Such quantity can vary over a wide range depending on the crosslinking agent and other ingredients in the composition. Generally, the quantity of the crosslinking agent will be from about 0.03% to 1% preferably from about 0.05% to 0.3% and particularly from 0.05% to 0.15% by weight on a dry basis of the adhesive composition.

Adhesion Promoter

The preferred adhesion promoters used in this invention are coupling agents based on organofunctional silanes. The preferred organofunctional silanes are those which contain epoxy or acrylic functional groups. Illustrative of adhesion promoters there can be mentioned: 3-glycidoxy-propyltrimethoxysilane; beta-(3,4-epoxycyclohexyl)ethyltrimethoxysilane; gamma-methacryloxypropyltrimethoxysilane; gamma-glycidoxypropyltrimethoxysilane; and gamma-aminopropyltriethoxysilane. The quantity of adhesion promoter is that which is sufficient to increase adhesion of the composition. Such quantity can vary over a broad range such as that of about 0.05% to 1% and preferably 0.1% to 0.5% by weight on a dry basis of the adhesive composition.

The compositions of the present invention may be used to provide contact adhesion for a variety of substrates. The materials joined together can be the same or different. Such substrates include wood, plastic laminates, paper, various minerals such as glass, carbon fiber, concrete, ceramics, and metals such as iron, steel, and aluminum.

The contact adhesives of the present invention can be prepared by conventional means such as by simply mixing the various ingredients together at room temperature.

The following examples are illustrative of the invention. Also set forth are brief descriptions of the identity of trademarked and tradenamed products mentioned in this specification.

The term "open time" as used herein is the maximum time lapse between applying the adhesive on substrates and bringing them together to obtain a satisfactory bond. The term "yield" as used herein is the weight of adhesive on two substrates which are subsequently joined and wherein such weight is divided by the gluing area. The percentages of ingredient concentrations in the following examples, except for the formula shown in Example 1, are by weight on a wet basis whereas, unless the context indicates otherwise, the dry basis is used for ranges of the various ingredients elsewhere in the specification, in the formula of Example 1, and the claims.

Trade Name and Trademarked Products

1. RHOPLEX CA 63M. This is a vinyl acrylic supplied by Rohm and Haas.

2. NEOPRENE LATEX 115. This is an aqueous emulsion of a carboxylated polychloroprene supplied by Du Pont de Nemours & Co. It contains a non-ionic copolymer of chloroprene and methacrylic acid dispersed with polyvinyl alcohol and contains about 47% solids.

3. AIRFLEX 426. This is a carboxylated vinyl acetate-ethylene polymer emulsion supplied by Air Products and Chemicals, Inc. It is a high-solids carboxylated vinyl acetate-ethylene terpolymer emulsion having a minimum of 62% solids which uses polyvinyl alcohol as a protective colloid.

4. NEOPRENE LATEX 750. An anionic polychloroprene latex supplied by Du Pont de Nemours & Co. This product is not carboxylated.

5. IRGANOX 1010. This is an antioxidant dispersion supplied by Ciba-Geigy.

6. CYMEL 303. This is a methylated melamine-formaldehyde resin supplied by American Cyanamid Co.

7. NEOPRENE LATEX 5587. This is a polychloroprene latex supplied by Du Pont de Nemours & Co. This product is not carboxylated.

8. STAYBELITE ESTER 3. This is a hydrogenated rosin tackifier aqueous dispersion supplied by Hercules, Inc.

9. DOWANOL P.M.A. This is a modified glycol supplied by Dow Quimica.

10. TACOLYN 64. This is a wood rosin aqueous dispersion supplied by Hercules, Inc.

11. HERCOLYN D. This is a wood rosin aqueous dispersion supplied by Hercules, Inc.

12. HALOFLEX 320. This is a commercial vinyl acrylic latex supplied by Imperial Chemical Industries.

13. PL 117. This is a urea-formaldehyde resin supplied by Borden, Inc.

EXAMPLE 1

This example compares the performance of various contact adhesives. This comparison involves a water-based composition of the present invention, a solvent based composition and a commercially available water-based composition using a vinyl acrylic latex. The products had the following compositions by weight on a dry basis:

|  | Quantity |
|---|---|
| Solvent Based Contact Adhesive | |
| Aromatics | 47.4% |
| Aliphatics | 30.0% |
| Metallic Oxide | 0.5% |
| Antioxidant | 0.1% |
| Phenolic Resin | 7.0% |
| Polychloroprene | 15% |
| Adhesive of This Invention | |
| NEOPRENE LATEX 115 | 44.5% |
| AIRFLEX 426 | 25% |

-continued

| | Quantity |
|---|---|
| TACKIFIER (ROSIN ESTER) | 30% |
| GLYOXAL | 0.1% |
| ORGANOFUNCTIONAL SILANE | 0.4% |

The commercially available water-based contact adhesive product in this example used an acrylic polymer as the adhesive agent. The acrylic polymer was that of RHOPLEX CA 63M.

In Table 1 below, as well as in the tables of the remaining examples: the solids were determined from a 1 gram (g) sample of the adhesive after one hour at 105° C.; the viscosity was determined in centipoise (cP) by LVF Brookfield viscometer at 25° C. by use of a number 3 spindle at 30 revolutions per minute unless the viscosity reading includes a fraction in parenthesis wherein the numerator of the fraction refers to the spindle number and the denominator refers to the revolutions per minute; the tensile strength was determined by an Instron tester by testing wood adhered to wood 24 hours after joining the wood samples; the open time, also referred to as drying time, was determined on wood having a mean (average) porosity; the yield was determined on a wood-formica joint; the oven stability was measured after 30 days at 45° C.; and the pH was determined at 25° C. The term "min" in the tables denotes minutes.

It can be seen from Table 1 below that in comparison to the adhesive of this invention: (a) the solvent based contact adhesive had lower yield, lower tensile, and showed viscosity increase during storage; and (b) the water-based acrylic based contact adhesive had higher open time, lower tensile, and presented a stability problem with phase separation and loss of tack.

TABLE 1

| | Solvent | Acrylic | This Invention |
|---|---|---|---|
| Solids | 22% | 50% | 50% |
| Viscosity | 2000 cP | 1,000 cP | 1,000 cP |
| pH 25° C. | — | 5.5 | 5.5 |
| Open time | 15 (min) | 60 (min) | 30 (min) |
| Tensile | 24 kg/cm$^2$ | 27 kg/cm$^2$ | 40 kg/cm$^2$ |
| Yield | 250 g/m$^2$ | 150 g/m$^2$ | 150 g/m$^2$ |
| Stability | 10% viscosity increase | Phases were separating and there was loss of tack | No phase separation and no viscosity increase |

EXAMPLE 2

Use of polychloroprene latex products described in the current literature generally lead to very unstable formulations. Table 2A (Formulations) and Table 2A (Test Results) below illustrate the importance of latices containing carboxylated functionalities. In addition, current practices, requires the use of zinc oxide dispersions for crosslinking and the use of solvents to reduce the open time in contact adhesive formulations. This is true, as shown in Table 2B (Formulations) and Table 2B (Test Results) even with a polychloroprene latex which contained carboxyl functions.

TABLE 2A

| (Formulations) | | |
|---|---|---|
| | (1) | (2) |
| NEOPRENE LATEX 115 | 71.8% | — |
| NEOPRENE LATEX 750 | — | 71.8% |
| ZnO Dispersion | 1.5% | 1.5% |
| IRGANOX 1010 Dispersion | 1.8% | 1.8% |
| Propylene Glycol | 1.1% | 1.1% |
| CYMEL 303 | 2.8% | 2.8% |
| Rosin Ester Tackifier at 50% solids | 20.8% | 20.8% |
| Water | 0.2% | 0.2% |
| | 100.00 | 100.00 |
| (Test Results) | | |
| | (1) | (2)* |
| VISCOSITY | 1200 cP | |
| pH | 8.81 | |
| OPEN TIME | 28 min. | |
| SOLIDS | 47.6% | |
| TENSILE | 27 Kg/cm$^2$ | |

*Adhesive of Formulation (2) above was unstable with phase separation within a few hours after manufacture and showed very low tack and low wood penetration.

*Adhesive of Formulation (2) above was unstable with phase separation within a few hours after manufacture and showed very low tack and low wood penetration.

TABLE 2B

| | (1) | (2) | (3) |
|---|---|---|---|
| (Formulations) | | | |
| NEOPRENE LATEX 115 | 45.00% | 27.00% | 55.0% |
| NEOPRENE LATEX 5587 | — | 18% | — |
| ZINC OXIDE | 0.15% | 0.15% | 0.15% |
| DIETHANOL AMINE | 0.15% | 0.15% | 0.15% |
| MAGNESIUM OXIDE | — | — | 0.10% |
| GLYOXAL | 0.15% | 0.15% | 0.15% |
| ANTIOXIDANT DISPERSION (10%) | 0.10% | 0.10% | 0.10% |

TABLE 2B-continued

|  | (1) | (2) | (3) |
|---|---|---|---|
| ROSIN ESTER 50% SOLIDS | 10.00% | 10.00% | 10.00% |
| STAYBELITE ESTER 3 | 6.00% | 7.00% | — |
| PHENOLIC RESIN PTBF (50% DOWANOL PMA) | — | — | 7.00% |
| POLYVINYL ALCOHOL (15% AQUEOUS SOLUTION) | 5.00% | 5.00% | 3.50% |
| ANTIFOAM | 0.10% | 0.10% | 0.10% |
| DOWANOL P.M.A. | 0.20% | 0.20% | 0.10% |
| WATER | 33.15% | 32.15% | 23.65% |
|  | 100.00 | 100.00 | 100.00 |
|  | (Test Results) |  |  |
| VISCOSITY | 5400 cP (3/12) | 1680 cP (4/50) | 4500 cP (3/30) |
| SOLIDS | 37.5% | 39.3% | 40.0% |
| pH | 9.70 | 9.35 | 9.80 |
| DRYING TIME | 20 min. | 20 min. | 20 min. |
| TENSILE | 38.0 Kg/cm$^2$ | 44.0 Kg/cm$^2$ | 40.0 Kg/cm$^2$ |

EXAMPLE 3

Adhesive formulations use different tackifiers to provide tack to the product. Many tackifiers are available commercially. Table 3 shows the use of a resin dispersion, containing 50% solids in conjunction with various tackifying resins to provide the necessary tack retention time.

TABLE 3A

|  | (1) | (2) | (3) |
|---|---|---|---|
| (Formulations) |  |  |  |
| NEOPRENE LATEX 115 | 45.00% | 45.00% | 45.00% |
| ZINC OXIDE | 0.15% | 0.15% | 0.15% |
| DIETHANOLAMINE | 0.15% | 0.15% | 0.15% |
| GLYOXAL | 0.15% | 0.15% | 0.15% |
| ANTIOXIDANT | 0.10% | 0.10% | 0.10% |
| DOWANOL P.M.A | 0.10% | 0.20% | 0.20% |
| ANTIFOAM | — | — | — |
| WATER | 41.35% | 33.25% | 33.25% |
| TAKOLYN 64 | 3.00% | — | — |
| ROSIN ESTER DISPERSION (50% SOLIDS) | 10.00% | 10.00% | 10.00% |

TABLE 3A-continued

|  | (1) | (2) | (3) |
|---|---|---|---|
| HERCOLYN D | — | 6.00% | — |
| STAYBELITE ESTER 3 | — | — | 6.00% |
| POLYVINYL ALCOHOL 15% | — | 5.00% | 5.00% |
|  | 100.00 | 100.00 | 100.00 |
|  | (Test Results) |  |  |
| TACK RETENTION TIME | 30 MIN | 30 MIN | 30 MIN |

EXAMPLE 4

Vinyl acrylic latices have been described in the literature as suitable for formulating water-based contact adhesives, in conjunction with polychloroprene latex. Generally, such products are characterized by high viscosity, low strength and poor stability. The tables of this example illustrate the improvements in these characteristics as shown by compositions of this invention.

TABLE 4A

|  | (1) | (2) | (3) | (4) |
|---|---|---|---|---|
| (Formulations) |  |  |  |  |
| NEOPRENE LATEX 115 | 39.20% | 33.00% | 45.00% | 47.00% |
| HALOFLEX 320 | 28.00% | 20.00% | — | — |
| AIRFLEX 426 | — | — | 15.00% | 21.00% |
| EPOXY SILANE | 0.05% | 0.20% | 0.25% | 0.20% |
| ACRYLIC SILANE | — | 0.30% | 0.20% | 0.20% |
| POLYVINYL ALCOHOL (10% AQUEOUS SOLN) | 10.00% | 21.40% | 10.00 | — |
| GLYOXAL | 0.05% | 0.10% | 0.10% | 0.10% |
| TACKIFIER RESIN ROSIN ESTER 50% AQUEOUS DISPERSION | 22.70% | 25.00% | 29.45% | 31.50% |
|  | 100.00 | 100.00 | 100.00 | 100.00 |
|  | (Results) |  |  |  |
| SOLIDS | 46.00% | 41.5% | 47.0% | 52% |
| VISCOSITY | 2800 cP (4/60) | 2900 cP (4/60) | 1040 cP (3/30) | 1450 cP (3/30) |
| pH | 6.38 | 6.34 | 5.74 | 6.6 |
| TENSILE | 29.0 Kg/cm$^2$ | 28.8 Kg/cm$^2$ | 32.0 Kg/cm$^2$ | 38.0 Kg/cm$^2$ |

TABLE 4A-continued

|  | (1) | (2) | (3) | (4) |
|---|---|---|---|---|
| DRYING TIME | 30 MIN. | 30 MIN. | 25 MIN. | 24 MIN. |

EXAMPLE 5

The use of melamine and urea resins to achieve high adhesive strengths and peel resistance is known. The formulations and test results in the 5A Tables show the improvements in strength by the use of a silane adhesion promoter. These silane adhesion promoters interact with the latex system as shown by the viscosity increases. This results in shorter drying time and higher bonding strengths.

TABLE 5A

|  | (1) | (2) | (3) | (4) |
|---|---|---|---|---|
|  | (Formulations) | | | |
| NEOPRENE LATEX 115 | 47.00% | 46.40% | 44.40% | 44.40% |
| GLYOXAL | 0.10% | 0.10% | 0.10% | 0.104 |
| ROSIN ESTER DISPERSION (50%) | 31.50% | 31.50% | 31.50% | 31.50% |
| ACRYLIC VINYL RESIN | 21.00% | 21.00% | 21.00% | 21.00% |
| MELAMINE RESIN | — | 1.00% | 3.00% | — |
| EPOXY SILANE | 0.20 | — | — | — |
| ACRYIC SILANE | 0.20% | — | — | — |
| PL 117 | — | — | — | 3.00% |
|  | 100.00% | 100.00% | 100.00% | 100.00% |
|  | (Results) | | | |
| Viscosity | 1320 cP (3/30) | 410 cP (3/60) | 380 cP (3/60) | 440 cP (3/60) |
| pH | 5.57 | 5.62 | 5.64 | 5.67 |
| Tensile | 38.1 Kg/cm$^2$ | 27.7 Kg/$^2$ | 36.6 Kg/$^2$ | 30 Kg/$^2$ |
| Solids | 50% | 49.5% | 50.0% | 50.0% |
| Drying Time | 25 min | 40 min | 50 min | 35 min |

What is claimed is:

1. A water based contact adhesive comprising, by weight on a dry basis:
   A. about 35% to 55% of a carboxylated polychloroprene latex;
   B. about 15% to 35% of an emulsion of a carboxylated polymer of vinyl acetate and ethylene;
   C. about 20% to 40% of a tackifier resin dispersion; and
   D. an organic crosslinking agent in an amount sufficient to crosslink the carboxylated functions of the latex and the emulsion.

2. The adhesive of claim 1 wherein the composition contains an organofunctional silane adhesion promoter.

3. The adhesive of claim 2 wherein the crosslinking agent is glyoxal.

4. The adhesive of claim 2 wherein the crosslinking agent is in a quantity of about 0.03 to 1% and the adhesion promoter is in a quantity of about 0.05 to 1%.

5. The adhesive of claim 2 wherein the crosslinking agent is glyoxal in a quantity of about 0.05% to 0.3% and the organofunctional silane has acrylic or epoxy functional groups.

6. The adhesive of claim 1 wherein the tackifier is a member selected from the group consisting of a: rosin; hydrocarbon resin; terpene resin; phenolic resin; urea-formaldehyde resin; and melamine-formaldehyde resin.

7. The adhesive of claim 6 wherein the tackifier is a rosin ester.

8. The composition of claim 1 wherein the polychloroprene latex is stabilized with polyvinyl alcohol.

9. The adhesive of claim 1 wherein the carboxylated vinyl acetate-ethylene polymer is stabilized with polyvinyl alcohol.

10. A water-based contact adhesive comprising, by weight on a dry basis:
    A. about 40% to 50% of carboxylated polychloroprene latex;
    B. about 20% to 30% of a carboxylated vinyl acetate-ethylene polymer emulsion;
    C. about 25% to 35% of a tackifier resin dispersion;
    D. about 0.05% to 0.3% of a water soluble crosslinking agent for crosslinking the carboxylated portion of the polymers; and
    E. about 0.1% to 0.5% of an organofunctional silane adhesion promoter.

11. The adhesive of claim 10 wherein the crosslinking agent is glyoxal and the silane is selected from the group consisting of an organofunctional silane having an acrylic group; an organofunctional silane having an epoxy group; and mixtures thereof.

12. The adhesive of claim 11 wherein the organofunctional silane has an epoxy group.

13. The adhesive of claim 11 wherein the organofunctional silane has an acrylic group.

14. The adhesive of claim 10 wherein the crosslinking agent is a member selected from the group consisting of: urea-formaldehyde resin; melamine-formaldehyde resin; phenol-formaldehyde resin; and an aldehyde.

15. The adhesive of claim 14 wherein the crosslinking agent is glyoxal.

16. A water-based contact adhesive comprising by weight on a dry basis:
    A. about 35% to 55% of carboxylated polychloroprene;

B. about 15% to 35% of a carboxylated polymer of vinyl acetate and ethylene;

C. about 20% to 40% of a tackifier resin;

D. about 0.03% to 1% of a water soluble crosslinking agent for the carboxylated polychloroprene and vinyl acetate-ethylene polymer; and E. about 0.05% to 1% of an organofunctional silane adhesion promoter.

17. A water-based contact adhesive consisting essentially of, by weight on a dry basis:

A. about 40% to 50% of a carboxylated polychloroprene latex;

B. about 20% to 30% of a carboxylated vinyl acetate-ethylene polymer emulsion;

C. about 25% to 35% of a tackifier resin dispersion;

D. about 0.05% to 0.3% of a water soluble crosslinking agent for crosslinking the carboxylated portion of the polymers; and E. about 0.05% to 1% of an organofunctional silane adhesion promoter.

18. The adhesive of claim 17 wherein the crosslinking agent is glyoxal and the silane is selected from the group consisting of: an organofunctional silane having an acrylic group; an organofunctional silane having an epoxy group; and mixtures thereof.

19. The adhesive of claim 17 wherein the crosslinking agent is a member selected from the group consisting of: urea-formaldehyde resin; melamine formaldehyde resin; phenol-formaldehyde resin and an aldehyde.

* * * * *